United States Patent [19]

Butler

[11] Patent Number: 4,718,759
[45] Date of Patent: Jan. 12, 1988

[54] APPARATUS FOR THE ALIGNMENT AND BALANCE OF THE WHEELS OF A MOTOR VEHICLE

[76] Inventor: Louis L. Butler, 12489 Lockhaven Ave., Baton Rouge, La. 70815

[21] Appl. No.: 733,603

[22] Filed: May 13, 1985

[51] Int. Cl.$^4$ .......................................... G01B 11/275
[52] U.S. Cl. .................................. 356/152; 33/203.18; 33/288
[58] Field of Search ...................... 356/152, 155, 141; 33/203.16, 203.18, 286, 288

[56] References Cited

U.S. PATENT DOCUMENTS

| 3,782,831 | 1/1974 | Senften | 33/288 X |
| 4,150,897 | 4/1979 | Roberts, Jr. et al. | 356/152 |
| 4,302,104 | 11/1981 | Hunter | 33/288 X |
| 4,336,658 | 6/1982 | January et al. | 356/152 X |
| 4,377,038 | 3/1983 | Ragan | 33/288 X |
| 4,381,548 | 4/1983 | Grossman et al. | 33/288 X |
| 4,402,603 | 9/1983 | Lill | 356/152 |
| 4,408,399 | 10/1983 | Darwood et al. | 33/203.18 |
| 4,416,065 | 11/1983 | Hunter | 33/288 X |
| 4,466,196 | 8/1984 | Woodruff | 33/288 |
| 4,523,844 | 6/1985 | Titsworth et al. | 33/288 X |
| 4,594,789 | 6/1986 | Marino et al. | 33/288 |
| 4,615,618 | 10/1986 | Bailey et al. | 33/203.18 X |

OTHER PUBLICATIONS

A. Chang, "Automatic Wheel Alignment Measuring Instrument," *IECI '78 Proceedings*, Mar. 20-22, '78, pp. 99-105.

Primary Examiner—Stephen C. Buczinski
Assistant Examiner—Linda J. Wallace
Attorney, Agent, or Firm—Llewellyn A. Proctor

[57] ABSTRACT

A wheel alignment system for measuring the angular values of the steerable and non-steerable wheels of a vehicle, including caster, camber, toe, set back and track, as computed from references taken from the chassis of the vehicle. The wheel alignment system includes apparatus comprised of one or more pairs of wheel unit sensor assembly units, each of a pair of which can be mounted via a wheel clamp assembly upon the parallelly disposed wheels of the vehicle, to measure the wheel alignment angles of the steerable and non-steerable wheels of the vehicle. These measurements can be progressively fed, as the alignment proceeds, into a microprocessor, or central processing unit of a computer, the computations displayed as a readout, suitably upon a video screen associated therewith, and these values compared with the manufacturer's specifications of the different wheel alignment settings of a given vehicle selected from the memory of the computer. The computer can provide wheel runout compensation for improved accuracy, and a permanent printout can be made of the alignment, as the alignment proceeds.

14 Claims, 11 Drawing Figures

APPARATUS FOR THE ALIGNMENT AND BALANCE OF THE WHEELS OF A MOTOR VEHICLE

FIELD OF THE INVENTION

This invention relates to an improved apparatus, and method, for the alignment and balance of the wheels of a motor vehicle. In particular, it relates to apparatus wherein sequences of operating instructions, and settings required for various motor vehicles are prerecorded in a microprocessor or central processing unit of a computer, preselections are made and displayed on a video screen, corrections are made in the wheel alignments in accordance with said preselections, inputs are made to the central processing unit from wheel sensing units and visually displayed as corrections are made in the wheel alignments, and visual comparisons are made as the wheels are brought into proper alignment.

BACKGROUND AND PROBLEMS

Proper wheel alignment and balance are essential in providing maximum safety, ease of handling, stability and directional control in all motor vehicles. The steering geometry of each vehicle must be adjusted to specifications recommended by the manufacturer. Different makes and models require different settings; these settings being published for each vehicle by each manufacturer, respectively. Wheel alignment and balance generally requires the following measurements, and corrections, to wit:

Set back: Set back refers to the relative forward positions of the two front wheels. When one front wheel is more rearward than another, this wheel is set back from the other.

Camber: Camber is the inward or outward tilt of a wheel at the top viewed from the front of the vehicle. Inward tilt is measured as negative camber, and outward tilt as positive camber. Camber measurements are taken from true vertical and measured in degrees. True vertical is zero.

Caster: Caster is the forward or backward tilt of the king pin or ball joint steering support arm at the top when viewed from the side. Forward tilt of the king pin or ball joint steering support arm is negative caster, and backward tilt positive caster. Caster is measured in the number of degrees from true vertical; true vertical being zero.

Steering axis inclination (or king pin inclination): Steering axis inclination is the inward tilt of the king pin or ball joint steering supports at the top. A line drawn through the centers of the ball joints is called the steering axis; this being the line about which the steering knuckle pivots as the wheel swings from left to right. Steering axis inclination is defined as the centerline around which the front wheel swings for steering. Steering axis inclination is measured in degrees.

The included angle: In front-end geometry, the included angle is the camber andle plus the steering axis inclination angle. This angle determines the point of intersection of the tire centerline with the steering axis or ball joint centerline. The angle is non adjustable, and the damaged parts must be replaced. Generally, the damaged part is a bent spindle, or bent spindle support arm.

Toe: Toe is the inward or outward tilt of a wheel at its front. Toe in of the front wheels occurs when the front wheels are closer together at the front than at the rear. Toe out occurs when the front wheels are further out in the front than at the rear.

Tracking: Tracking means that the rear wheels follow the front wheel in a parallel position. The rear wheels must follow the front wheels for good steering, handling and vehicle stability.

Vehicle safety depends to a large extent on a mechanic's ability to follow procedures and specifications recommended by the manufacturer on making wheel alignments, and adjustments. Camber, caster and toe in, for example, are adjustable on most vehicles, generally by the use of shims, eccentrics, slotted hole adjustments, or adjustable rods. Steering axis inclination and toe out on turns are not adjustable, but it is nonetheless essential that such measurements be made, and corrected. The precision and accuracy of prior devices for making such measurements varies greatly, and have many shortcomings.

The prior art teaches various combinations of apparatus for measuring the alignment of the steerable and non-steerable wheels of vehicles, e.g. caster, camber, toe, included angle, set back and track. The wheels are affixed to the body or chassis of a vehicle in manufacture as per engineering datum information to correlate the relationship of the wheels to the body or chassis of the vehicle. This datum information is commonly referred to as datum points and used as reference when repairing body and or chassis of wrecked vehicles. Since the non-steerable wheels of a vehicle are fixed by the manufacturer, and most are non-adjustable, special equipment is required to physically reposition these wheels. Most wheel alignment shops and service facilities do not have this type of equipment but it is nonetheless important that they be able to identify wheel to body, or chassis, relationships. The actual heading of the vehicle is usually determined by the thrust or track of the non-steerable wheels, which inturn affect the parallel relationship with the front wheels and their relationship with respect to steering wheel position.

For practical and economic considerations and for correcting so called mis-matching and tolerance buildup in manufacture, more and more manufacturers are making provisions for mechanically adjusting wheel positions relative to the body or chassis of the vehicle. This appears the best way for making corrections since the ideal geometric configuration of a four wheel vehicle is said to be a rectangle in which: (i) the steerable wheels will run parallel with each other and are equidistant from the center of the connecting axle or its equivalent; (ii) the non-steerable wheels will run parallel with each other and are equidistant from the center of the connecting axle or its equivalent; (iii) the non-steerable wheels either track with the steerable wheels or are equally off set from the steerable wheel tracks; and (iv) the vehicle body has it longitudinal geometric center line coincident with the longitudinal center line for both the steerable and non-steerable wheels. Unfortunately however, most prior art wheel alignment devices, and systems have not employed this ideal for making wheel alignment corrections. Most have relied upon interpreting some secondary references, or indicia, located adjacent the vehicle wheel, or chassis; information available only to the mechanic making the measurements. While alignment systems have been devised for remotely displaying like information, these alignment apparatus require excessive number of mechanical parts and electronic components. The required mechanical or optical coupling of apparatus of this type in sets to the steerable and non-steerable wheels complicate the procedure, which affect the accuracy of the information inasmuch as the procedure is usually entirely dependent upon the skill of the individual mechanic.

OBJECTS

A primary object of the present invention is to provide new and improved apparatus for the alignment and balance of the wheels of a motor vehicle.

A particular object of the present invention is to provide a novel wheel clamp assembly for attachment to the wheel of a vehicle, and novel wheel unit sensor assembly for mounting thereupon the latter when adjusted upon said wheel clamp assembly in unison with a second wheel unit sensor assembly similarly mounted upon a parallelly disposed wheel can be employed to measure wheel alignment angles.

A yet more specific object is to provide a wheel unit sensor assembly for mounting upon the steerable and non-steerable sets of wheels, having novel sensing means reference to chassis datum points so that more precise alignment data can be obtained; particularly sensing means with electronic capabilities for sensing and compensating for the normal physical inaccuracies of the mechanical mounting means and wheel rims to improve wheel alignment measurements.

A further, and yet more specific object is to provide a computerized novel wheel unit sensor assembly, the sensing units of which are electronically communicated, or coupled, to a microprocessor, or central processing unit of a computer, to which inputs are made of the geometric condition or angularity of the wheels, and from which outputs are received comparing these conditions of wheel alignment and balance with the vehicle manufacturers recommended specifications of wheel alignment and balance for the specific vehicle whose wheels are being aligned and balanced.

A yet further, and more specific object is to provide a console wherein the microprocessor, or central processing unit is housed, with a C.R.T. monitor or video screen, the wheel settings and geometric conditions or angularity of the wheels as registered by the wheel unit sensor assemblies electronically coupled therewith are recorded and numerically, or graphically displayed, or both, on the C.R.T. monitor, or video screen, these settings compared with the vehicle manufacturer's recommended settings programmed therewith and displayed, corrections made in the wheel settings, and the new wheel settings recorded and numerically or graphically displayed, or both, or printed via printout means, or both, to provide a permanent record of the alignment history.

THE INVENTION

These objects and others are achieved in accordance with the present invention embodying apparatus, characterized as one, or one or more pairs of wheel unit sensor assembly units, each of a pair of which can be mounted via a wheel clamp assembly upon the parallelly disposed wheels of a vehicle, inclusive of either or both of the steerable and non-steerable wheels of the vehicle, to measure the steering geometry, or wheel alignment angles and these measurements fed into a microprocessor, or central processing unit, of a computer and displayed as a readout, preferably upon a C.R.T. or video screen associated, or electronically coupled therewith. The manufacturer's specifications of the different wheel alignment settings of a given vehicle can be programmed into the computer, and these can be selected by the mechanic from the memory of the computer, displayed, and compared with those measured by the wheel unit sensor assemblies. The display, or readout, can be in the form of digital numbers compared alongside those recommended by the manufacturer, or can be displayed as graphics which physically resemble the wheels and associated wheel components, or both. As corrections are physically made in the alignment and balance of the wheels, the changes and progressions from one physical measurement to another can likewise be displayed, and a permanent printout made of the entire history of the alignment.

The microprocessor, or central processing unit, of the computer, is located within a console which also contains the C.R.T. or video screen. Given a particular vehicular make and model, from a particular customer, the wheels of which are to be aligned and balanced, the mechanic may enter into the microprocessor certain business information job numbers, date and time. Input is then made by the mechanic to the computer regarding the make of the vehicle, model and year producing, according to a computer program, a succession of instruction steps, which need be carried out by the mechanic to correct the wheel alignment of the vehicle. Selections are successively made for instruction steps relating to set back, caster, camber, included angle, and track and the manufacturer's required specifications compared side-by-side with the actual measurements input to the microprocessor, or central processing unit by the wheel unit sensor assembly units as the corrections are made. A permanent record can be made of the entire history of each alignment made on a vehicle.

These and other features and advantages of the invention will be better understood by reference to the following detailed description and to the accompanying drawings to which reference is made in the description. In the drawings, similar numbers are used to represent similar parts or components in the different figures, or views, and subscripts are used to designate a plurality of similar or analogous parts. Where a part is referred to using only a whole number where there are a number of similar or analogous components, the use of the number is intended in a generic sense.

In the drawings:

FIG. 5 depicts in partial section the central sensor housing portion of the wheel unit sensor assembly, this portion of the wheel unit sensor assembly including (i)

means for sensing caster, camber and the included angle of the steerable wheels of the vehicle, and in application the camber of the rear wheels, (ii) light transmitting system, and electric circuitry therefor, for transmitting a light beam to reflective means at the rear fixed wheels, and pick-up means for referencing the rear wheel track for positioning the steering wheel of the vehicle.

Figure 1:
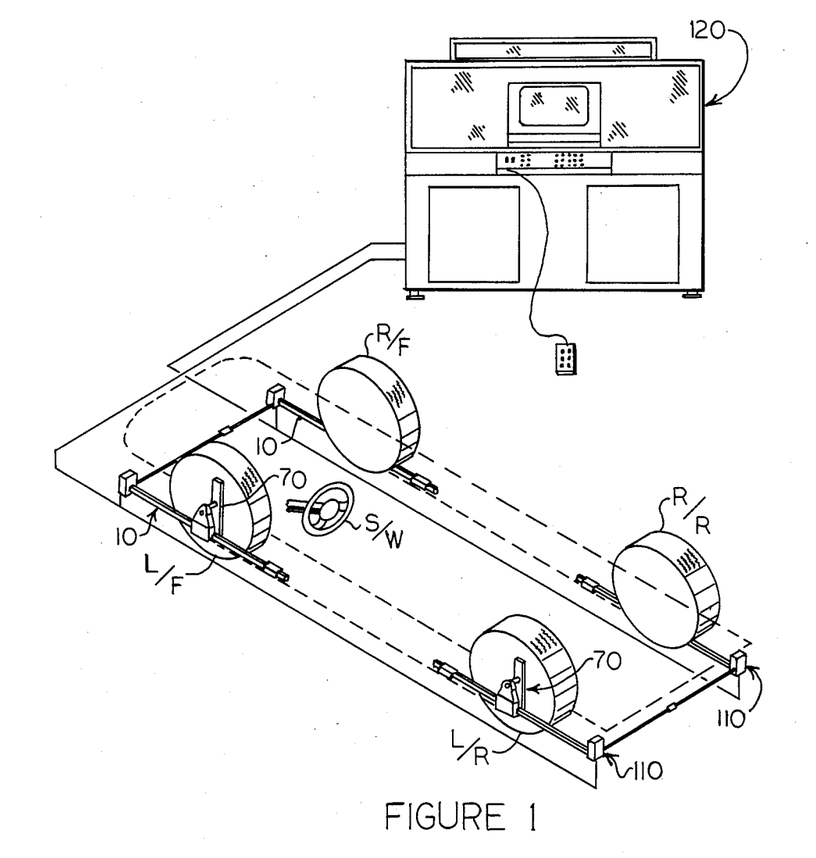
FIG. 1 depicts in perspective an automotive vehicle upon both the front and rear wheels of which is mounted a wheel unit sensor assembly, supported thereupon via a wheel clamp assembly, each wheel unit sensor assembly including electrical cables for providing input to the microprocessor of a computer contained in a console.

Referring first to FIG. 1, generally, there is shown an automotive vehicle, the wheels of which are provided with sensor units for measuring the steering angles, or steering geometry, of the steerable wheels of the vehicle. Wheel unit sensor assemblys 10, each supported upon a front wheel via attachment to a wheel clamp assembly 70 in turn mounted on a wheel rim are used to measure front wheel set back, steering axis inclination or KPI, caster, camber and toe. These same units can be shifted to the rear wheels to measure the camber, toe and track of the rear wheels, or non-steerable wheels, as may be required. On the other hand, rear wheels can also be provided with wheel unit sensor assembly units 110, which in combination with the wheel unit sensor assembly 10 mounted upon the front wheels can be used to determine the orientation or position of the vehicle steering wheel as referenced by the thrust of the rear wheels, and whether or not they are parallelly aligned with, and follow the front wheels. Measurements from the wheel unit sensor assemblys 10, 110 are input to the microprocessor or C.P.U. of a computer mounted in the console 120 via suitable electrical cables.

Figure 1A:
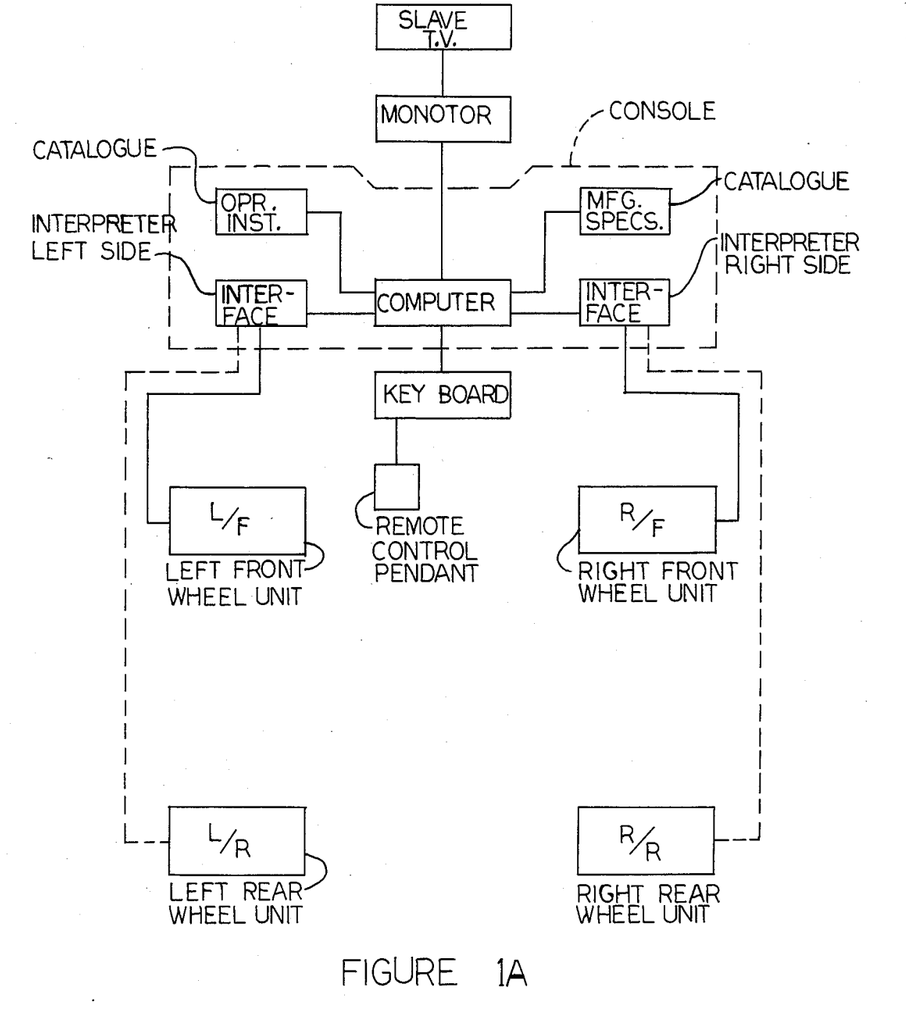
FIG. 1A is a schematic representation of a suitable wiring diagram whereby wheel alignment values recorded by the wheel unit sensor assemblys are input to the computer of the console unit, measurements made electronically, and recorded.

In FIG. 1A there is schematically depicted left and right front wheel sensor units 10 (L/F and R/F, respectively), and optionally and preferably generally similar wheel sensor units 110 (L/R and R/R, respectively) located on the rear wheels, and the manner in which these units are electronically tied in with the computer. Thus, the left front wheel unit L/F and right front wheel unit R/F are electronically coupled, and interface through appropriate leads with the left side interpreter and right side interpreter of the computer, respectively, and alternately the left rear wheel unit L/R and right rear wheel unit R/R can interface therewith by cutting out L/F and R/F, and cutting in L/R and R/R, respectively. The computer, which is coupled with a C.R.T. monitor, or television screen, is provided with a programmed catalogue of preferred vehicle manufacturers wheel alignment specificiations, e.g. a catalogue of wheel alignment specifications covering a previous ten year period. The system can also include a slave television set for viewing from a remote location, a keyboard or control panel for inputting instructions to the computer, and remote control pendant for use by the mechanic at a location somewhat remote from the keyboard, e.g. a location under the vehicle on which the mechanic is working. A special training program of operating instructions can also be provided, and input to the computer on demand.

Figure 2:
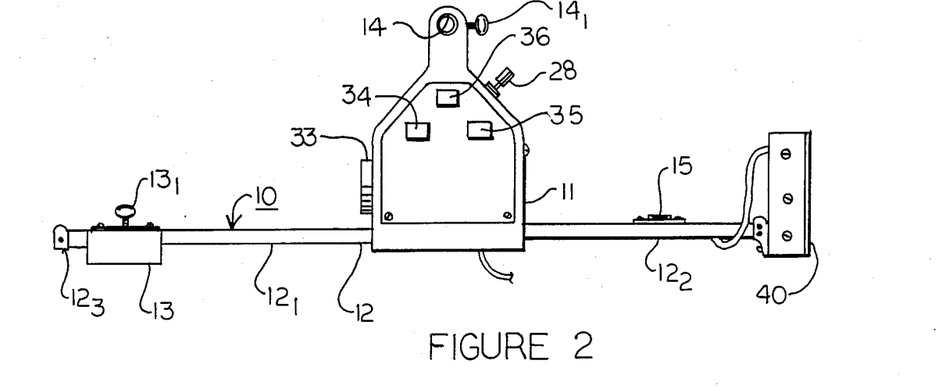
FIG. 2 depicts a front elevation view of a wheel unit sensor assembly.

Referring to FIG. 2, specifically, there is shown a wheel unit sensor assembly 10 (right front wheel unit sensor assembly) which includes generally a central sensor housing 11 which contains means for the measurement of caster, camber and included angle, a wheel unit sensor housing 40 which includes means for the measurement of toe, set back and track. The central sensor housing 11 is substantially centrally mounted upon an arm 12, and the wheel unit sensor housing 40 is mounted upon a terminal end of a segment $12_2$ of arm 12. A counter poise or weight 13 is slidably mounted, and adjustably positionable upon the opposite terminal end of arm 12 for use in mounting the wheel unit sensor assembly 10 horizontally upon a wheel. The counter poise or weight 13 can thus be moved in either direction upon portion $12_1$ of arm 12 by loosening the set screw $13_1$, up to the limits defined by a wall of the central housing 11 in one direction, and in the other direction by the projection or stop $12_3$ located on the terminal end of portion $12_1$ of arm 12. The wheel unit sensor assembly 10 can be horizontally mounted and suspended via the tubular segment 14 upon the wheel clamp assembly 70 by positioning the counter weight 13 in a location such that the levelling vial 15 on arm portion $12_2$ reads horizontal, at which position the counter weight 13 can be fixed by tightening down on the set screw $13_1$.

Figure 5:
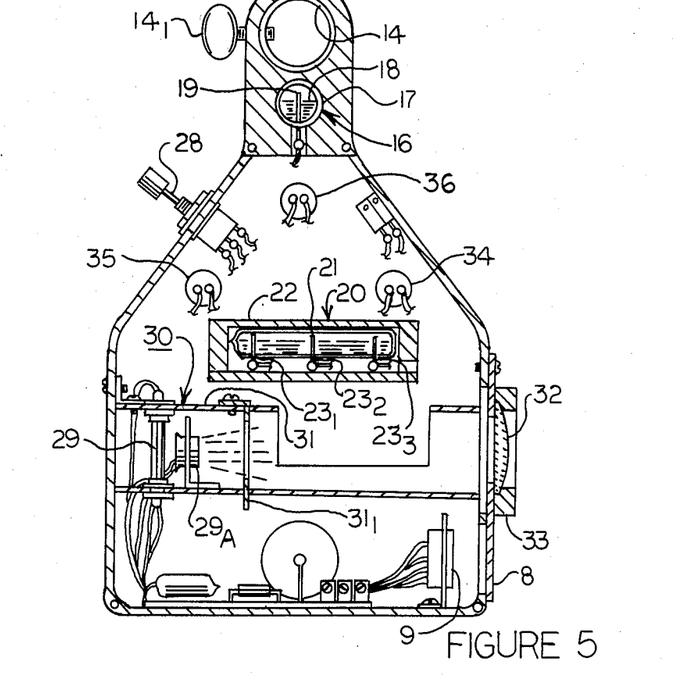

Caster, camber and included angle are measured via sensors located within the central sensor housing 11 of the wheel unit sensor assembly 10. The central sensor housing 10 also includes a dual track reference light system (Xenon and infrared) for use in measuring the orientation of the steering wheel as reference from the track of the rear wheels. Referring to FIG. 5, there is depicted within the central sensor housing 11 a caster and camber sensor 16, located in the top of the housing, and a KPI and included angle sensor 20, located against the back wall of the housing. The caster and camber sensor 16 is constituted of a tubular shaped closed container, or vial 17, filled with a low conductivity fluid, or liquid 18, of viscosity adequate to avoid the formation of waves. A plurality of bottom mounted, vertically oriented conductive probes 19 (i.e. $19_1$, $19_2$, $19_3$) are extended through a wall of the vial 17 upwardly above the surface level of the fluid, or liquid 18. The KPI and included angle sensor 20 is similarly constructed, differing only in its 90° difference in angle of orientation. The sensor 16 is horizontally mounted perpendicular to the plane of the wheel when the wheel unit sensor assembly 10 is positioned upon the wheel. The sensor 20 is horizontally mounted parallel with the plane of the wheel when the wheel unit sensor assembly 10 is positioned on the wheel. The KPI and included angle sensor 20 is thus similarly constituted of a tubular shaped closed container 21, filled with a low conductivity liquid 22 of sufficiently high viscosity that the formation of waves can be readily avoided. A plurality of bottom mounted, vertically oriented conductive probes 23, i.e. $23_1$, $23_2$, $23_3$, are projected through a bottom wall of the vial 21 upwardly above the surface level of the fluid, or liquid 22. The principle on which sensor 16, 20 operate are precisely the same, and hence the principle of operation of only one of these sensors, i.e. sensor 20 need be explained in detail.

Figure 5A:
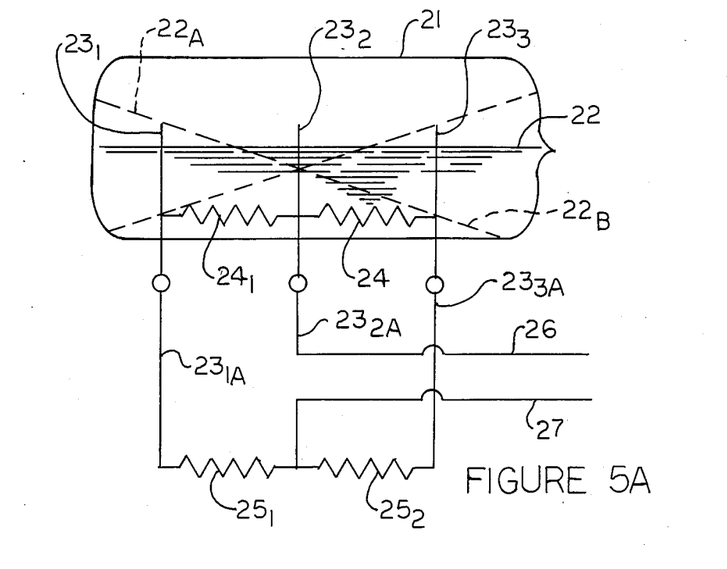
FIG. 5A depicts a schematic wiring diagram of one of the sensor elements of the central sensor housing portion of a wheel unit sensor assembly.

The conductive probes $23_1$, $23_2$, $23_3$, as depicted by reference to FIG. 5A, constitute a variable resistance unit of a bridge circuit which provides output signals indicative of the angle of inclination of the tube 21 from horizontal. Conductive probes $23_1$, $23_2$, $23_3$ are thus connected via leads $23_{1A}$, $23_{2A}$, $23_{3A}$, respectively. Resistances $24_1$, $24_2$ located between conductive probes $23_1$, $23_2$, $23_3$, with resistances $25_1$, $25_2$ form a bridge circuit with output signals on leads 26, 27 indicative of the liquid level 22; or $22_A$, $22_B$ which is level 22 displaced by the tilting of the vial 21. Thus, as the wheel is rotated it is apparent that deviations from horizontal will be manifested by changes in liquid level 22, which in turn will produce changes in the output signals fed into the computer via electrical leads 26, 27. Similarly, due to the different orientation of sensors 16, 20 it is apparent that as the wheel is rotated deviations from vertical will be manifested by changes in the liquid level 18 of vial 16, and this in turn will produce changes in the output signals to the computer. In use of the instrument, readings indicative of caster and camber are individually made, the sensor 16 being operative while sensor 20 is inoperative. On completion of taking readings for caster and camber, the normally closed double pole double throw momentary switch 28 is activated which cuts sensor 20 in and cuts sensor 16 out. Readings to determine KPI and included angle are then made.

The central sensor housing 11 also includes a dual track reference light system 30 for use in measuring the orientations of the front wheels to the thrust of the rear wheels for steering wheel position. The track reference light system 30 is constituted of a Xenon lamp 29 and an infrared L.E.D. $29_A$ mounted within a sub-housing unit 31. The infrared L.E.D. $29_A$ and Xenon tube 30 are electrically connected to a strobe and photo cell circuit board, located below said infrared L.E.D. $29_A$ and Xenon tube 29. Light emitted from the lamps passes through an aperture or slit provided in plate $31_1$ to fall upon a lens 32 held in a wall of the housing 11 via a lens holder 33. The Xenon and infrared light emitting diode lamps 29, $29_A$ are turned on and off via the target lamp switch 34. The use of the visible light permits line up or spotting of the appropriate indicia while the infrared, though invisible to the human eye, is more readily and accurately read electronically. The central sensor housing 11 also contains a pair of photosensitive resistance cells 9, and window and light filters 8 through which reflected infrared light can be transmitted to the photosensitive resistance cells 9, picked up by said photosensitive resistance cells 9, and signal transmitted via appropriate electrical leads to the computer. These particular structural features, as subsequently discussed, are employed for the measurement of the track of the rear wheels when additional wheel unit sensor assemblies 110 are mounted on the rear wheels and additionally provided with reflective surfaces, or mirrors, for reflection of the infrared light to indicate alignment of the rear wheel assembly, or the lack thereof. The track of a vehicle is off when the thrust of the rear wheels is in a direction angular to that of the center line C/L of the vehicle. The caster/camber zero switch 35 and run out switch 36 are also located within a wall of the housing 11.

Run out adjustment is made electronically by rotation of each wheel on which a wheel unit sensor assembly 10 is mounted through two one-half revolution turns of the wheel, taking a reading on each 180° revolution, inputting this to the computer and dividing the reading by two. This averages out any deviation, and electronically compensates for deviations. In making adjustment for run out in measuring caster and camber a wheel with its attached wheel unit sensor assembly 10 is rotated 180°, and this wheel position input to the computer by pressing run out switch 36. The wheel is then rotated 360°, and this wheel position input to the computer by pressing run out switch 36. In making adjustment for run out in measuring KPI and included angle this procedure is repeated. A wheel, to which a wheel unit sensor assembly 10 is attached, is rotated 180°, and this wheel position input to the computer by pressing the run out switch 36. The same adjustment is made at 360°, and this reading input to the computer by pressing run out switch 36.

Figure 6:
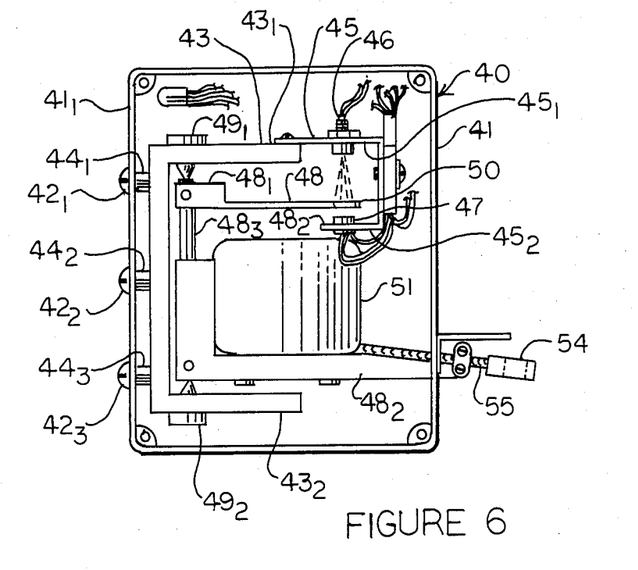
FIGS. 6 and 6A depict in partial section a portion of the wheel unit sensor unit used for the measurement of front wheel set back and toe, and in application the rear wheel track and toe.
Figure 6A:
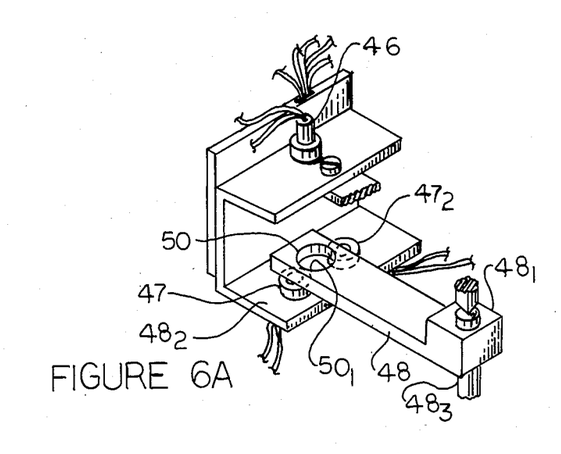

The wheel unit sensor housing 40 includes therein means for the measurement of toe, front wheel set back and track. The wheel unit sensor housing 40 includes a wall $41_1$ on which there is rigidly secured via a plurality of bolts $42_1$, $42_2$, $42_3$, a rigid frame assembly 43 comprised generally of a first yoke-like or U-shaped frame, set out slightly or spaced apart from said wall $41_1$ via a plurality of collars $44_1$, $44_2$, $44_3$. A second yoke-like or U-shaped frame 45, carrying a light emitting diode 46 and light detector 47, can be in turn, for convenience, rigidly mounted upon the first yoke-like frame 43. An end of a relatively long arm 45 thereof can thus be secured to an end of arm $43_1$, and a light emitting diode 46 mounted thereon, while a light detector 47 can be alternately disposed on the horizontally oriented segment $45_2$ of the yoke-like frame 45. The light detector 47 is thus mounted for convenience upon the second lower horizontally oriented segment $45_2$ of the yoke-like frame 45 and in direct alignment with the light emitting diode 46. The light detector 47 is preferably constituted of a pair of cells $47_1$, $47_2$ (FIG. 6A) slightly separated one from the other such that a beam of light emitted from the light emitting diode 46, at full emission, will fall upon the inside adjacent corners of the two cells $47_1$, $47_2$ at equal intensity. A third yoke-like frame 48 is pivotally mounted between the two arms $43_1$, $43_2$ of the yoke-like frame 43 via the screws $49_1$, $49_2$ the points of which are projected through arms $43_1$, $43_2$ of the rigidly affixed yoke-like frame 43 and into contact with the two terminal ends of the post $48_3$ of frame 48 to provide a hinged connection or rotational axis about which said frame 48 is secured upon the rigid U-shaped frame 43. An apertured shield 50, preferably a shield containing a single aperture $50_1$ through which light from the light emitting diode 46 can be passed is bolted to a terminal end of the arm $48_1$ of the pivotally connected yoke-like frame 48; and it is pivoted therewith. A null point is provided by transmission of light through the aperture $50_1$ which falls evenly upon the inside adjacent corners of the two cells $47_1$, $47_2$ of the light detector 47. Movement of the shield 50 on being pivoted away from the null point in either direction, as caused by movement of the pivotally connected yoke-like frame 48, will cause a greater, or lesser, amount of light to fall upon cell $47_1$ than upon $47_2$, or conversely upon cell $47_2$ than upon cell $47_1$, such change in pick-up of light by a cell being indicative of a change in angle between the orientation of the pivotally connected frame 48 relative to the rigidly mounted frame 43; and this change is directly translatable into a measure of wheel orientation. A tape reel 51 is mounted upon, and carried by the lower arm $48_2$ of pivotally connected frame 48. The tape reel 51 includes a projecting portion of arm $48_2$ which extends from the reel housing through a slit opening or slot 52, the terminal end thereof being sufficiently large that it cannot slip inwardly through the slot 52. The tape reel 51, and nozzle portion $51_1$, are laterally movable the width of the slot (not shown) in wall 41, and tape 53 can be readily withdrawn from the reel and attached, via the lock assembly 54, to the tape end of tape from the reel of an alternately mounted wheel unit sensor assembly.

A profoundly important feature of this type of sensor is that background light cannot enter into the closed housing 40 to produce error. The only light which can effect the readings is that emitted from the light emitting diode 46, which light is transmitted to cells $47_1$, $47_2$ via the aperture $50_1$ of the apertured shield 50.

Figure 3:
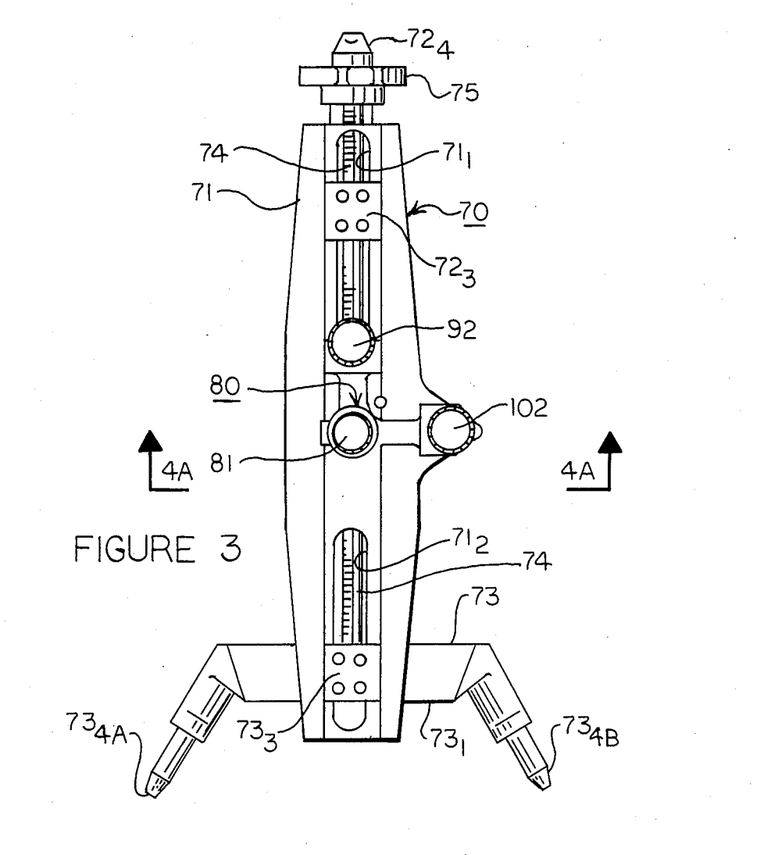
FIG. 3 depicts a front elevation view of a wheel clamp assembly; the unit which is directly attached to a wheel rim, and upon which a wheel unit sensor assembly is mounted.

The wheel clamp assembly 70, or assembly which is directly attached to the rim of a wheel to support a wheel unit sensor assembly 10, is best described by reference to FIGS. 3 and 4. Referring first to FIG. 3, a wheel clamp assembly 70 is constituted generally of an elongate slotted frame 71 provided with alternately disposed wheel rim clamps 72, 73. Each of the rim clamps 72, 73 are adjustably movable upwardly and downwardly along the longitudinal axis of the elongated frame 71, each within its respective slot $71_1$, $71_2$, via rotation of the knob 75 such that the clamps 72, 73 can be withdrawn inwardly, then thrust outwardly for engagement with a wheel rim to mount and rigidly secure the wheel clamp assembly 70 when it is placed upon the wheel of a vehicle. The elongate frame 71 in its preferred form, it will be observed, is provided with a pair of axially aligned elongate slots, an upper elongate slot $71_1$ within which the clamp 72 is slidably mounted, and a lower elongate slot $71_2$ within which the clamp 73 is slidably mounted. The clamp 72, it will be further observed, is provided within an enlarged base $72_1$, and a projecting portion $72_2$ (hidden) of relatively small width which extends through and mates with the parallelly aligned walls formed by the elongated slot $71_1$. The clamp 72 is held in place within the slot $71_1$ via an enlarged plate $72_3$ which is bolted to portion $72_2$ of the enlarged base $72_1$ to create, with the projecting portion $72_2$, alternately disposed grooves within the base of the clamp such that the clamp 72 is reciprocally movable back and forth within the slot $71_1$. The clamp 73 is similarly slidably mounted within the lower elongate slot $71_2$ via an alternately disposed pair of grooves formed by a relatively narrow projection $73_2$ which is extended from a base $73_1$ of large width through the slot $71_2$, and upon which narrow projection $73_2$ (hidden) there is bolted an enlarged plate $73_3$. The alternately disposed pair of grooves so-formed within the clamp 73 thus mate with the parallelly aligned walls formed by elongate slot $71_2$ and are slidable within the confines of said elongate slot $71_2$.

Each of the base portions $72_1$, $73_1$ of the clamps 72, 73 of the wheel clamp assembly 70 are provided with an internally threaded opening aligned one upon the other, and within and through each of which is passed an externally threaded turnbuckle screw 74. Suitably, the central portion of the externally threaded turnbuckle screw 74 is not threaded, is of relatively large diameter and set between a pair of fixed clamps $76_1$ (not shown), $76_2$ so that the threaded turnbuckle screw 74, while freely rotatable in either direction, cannot be displaced or dislodged from the elongate frame 71. The externally threaded turnbuckle screw 74 is conveniently rotated via use of the knob 75 mounted upon an end thereof. The two ends of the turnbuckle screw 74 are oppositely threaded such that rotation of knob 75, or turnbuckle screw 74, in one direction causes the clamps 72, 73 to move in unison outwardly away from each other; and conversely, movement of the knob 75, or shaft 74, in the opposite direction will cause the clamps 72, 73 to move in unison inwardly one toward the other. The clamp 72 is provided with a projecting finger $72_4$, and the clamp 73 with a pair of projecting fingers $73_{4A}$, $73_{4B}$ which extend outwardly from a bifurcated base 73. Rotation of the knob 75, or turnbuckle screw 74, in one direction can cause the projecting fingers $72_4$ and $73_{4A}$, $73_{4B}$ to move from an inward position outwardly in unison for engagement with the rim of a wheel; the fingered members $73_{4A}$, $73_{4B}$ generally being engaged to the bottom rim of a wheel, while the finger $72_4$ is generally engaged to the top rim of the wheel. The wheel clamp assembly 70 also includes a vertically and horizontally adjustable spindle assembly 80 upon which the wheel unit sensor assembly 10 is supported, and employed for balancing and alignment of the wheels of a vehicle.

Figure 4:
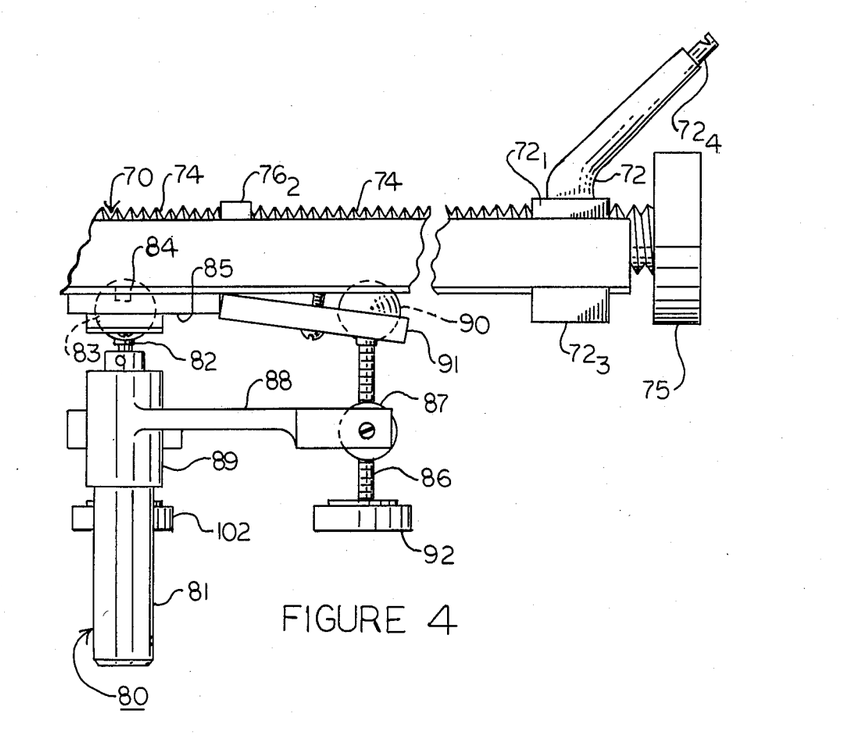
FIGS. 4 and 4A are fragmentary side views of said wheel clamp assembly.

The spindle assembly 80 of the wheel clamp assembly 70, referring to FIG. 4, includes a cylindrical or tubular member 81 the function of which is to serve as the supporting element for a wheel unit sensor assembly 10. The tubular member 81 is generally perpendicularly, pivotally mounted essentially at the center of the slotted frame 71, and it is of external diameter corresponding to the inside diameter of the tubular segment 14 of the central sensor housing 30 of a wheel unit sensor assembly 10, upon which the latter can be mounted, and supported. The tubular spindle 81 is thus affixed via a shaft 82 to a spherical shaped bearing 83, the bearing 83 being fitted within a mating indentation, or concave recess 84 within which it is rotatably mounted and held in place via bracket plate 85. The plate 85, it will be noted, is bolted to the frame 71 via a terminal end thereof, and it is provided with an inward concave face which is pressed against the upper convex face of the bearing 83, and it contains a relatively large open center through which the shaft 82 is passed. The tubular spindle 81 is provided with a vertical compensating screw 86, and a horizontal compensating screw 96. By virtue of the vertical compensating screw 86 the tubular spindle 81 can be tilted in either direction toward the major axis of the frame 71, viz. tilted upwardly or downwardly when the frame 71 of the wheel clamp assembly 70 is vertically mounted upon the wheel of a vehicle. The vertical compensating screw 86 is thus passed through an internally threaded opening of a block 87 bolted in place between the arms of a yoke member 88, an end of which is rigidly affixed via a collar 89 to the tubular spindle 81. A terminal end of the vertical compensating screw 86 is affixed to a spherical shaped bearing 90, the bottom of which rests in a concave, or hemi-spherical shaped recess within which it is retained via a bracket plate 91. The bracket plate 91 is provided with a concave inner face which is pressed inwardly agaisnt the outer face of the bearing 90, and a central opening through which the vertical compensating screw 86 is projected to make contact with the bearing 90. The bracket plate 91 is bolted in place on the frame 71 via a bolt which is passed through an opening located near the mid-portion thereof. Rotation of the knob 92 in one direction will tilt the tubular spindle 81 from a vertical position by moving the yoke member 88 outwardly away from the surface of frame 71. Conversely, rotation of the knob 92 in the opposite direction will tilt the tubular member 81 from a vertical position in the opposite direction by moving the yoke member 88 inwardly toward the surface of frame 71.

Figure 4A:
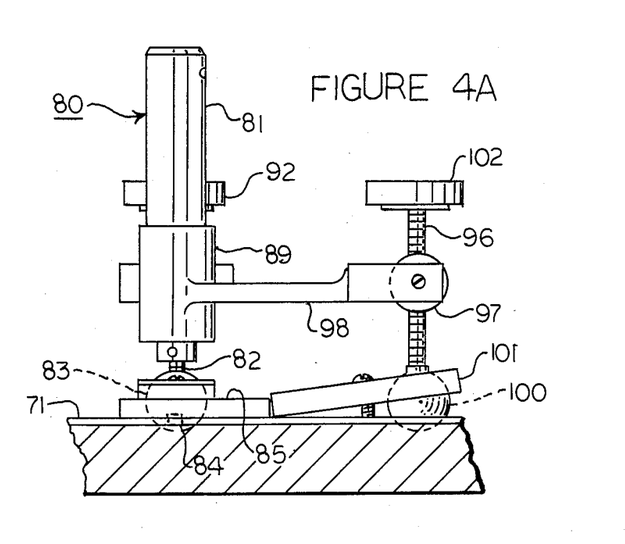

The horizontally compensating screw 96, shown by reference to FIG. 4A, is identical in construction, and operation with the vertical compensating screw 86 except that the former is located 90° out of phase with the vertical compensating screw 86. Hence it is designed to tilt the tubular spindle 81 along a horizontal plane when the frame 71 is vertically mounted upon the wheel of a vehicle. The horizontally compensating screw 96, is thus threadably engaged with the internally threaded opening of the block 97 of yoke member 98, the latter of which is connected via the collar 89 to the tubular spindle 81. One terminal end of the horizontally compensating screw 96 is affixed to a spherical shaped bearing 100, or ball, held in place in a mating notched concave shaped surface within the surface of frame 71 via a bracket plate 101. The inner face of the bracket plate 101 is provided with a concave surface which is pressed against the top of the bearing 100, and the bracket plate in turn is bolted via an end thereof to the surface of frame 71. Rotation of the knob 102 in one direction tilts the tubular spindle 81 in one horizontal direction, and the rotation in the other direction tilts the tubular spindle 81 in the opposite direction, when the wheel clamp assembly 70 is vertically aligned and attached to a wheel. In initiating an operation, the wheel unit sensor assembly 10 is mounted upon, and supported by the wheel clamp assembly 70 from a single suspension point. The wheel clamp assembly 70 is thus first mounted upon the wheel rim of a vehicle, and the tubular segment 14 of the wheel unit sensor assembly 10 is then fitted over the tubular spindle 81 of the wheel clamp assembly 70. The tubular spindle 81 of the spindle assembly 80 is properly positioned via adjustment of the vertical and horizontal compensating screws 86, 96 after mounting the wheel unit sensor assembly 10 upon the wheel clamp assembly 70. the computer readout will indicate any deviation of the spindle 81 away from vertical or horizontal. The sensor 16 within the upper portion of the central sensor housing 11 which is used to sense caster and camber will thus feed this information into the computer, which will in turn indicate any deviations of said spindle 81 from vertical or horizontal.

The wheel alignment and balance of a given vehicle is initiated, preferably by first installing the wheel clamp assembly 70 with the frame 71 thereof vertically aligned upon each of the front wheel rims of the vehicle, the clamps 72, 73 first being withdrawn, and then moved outwardly to grip the wheel rims. The clamp end $72_4$ of a clamp 72 is applied to the top of a wheel rim; while the clamp ends $73_{4A}$, $73_{4B}$ of a clamp 83 are applied to the bottom of a wheel rim. A wheel unit sensor assembly 10 is then installed upon the tubular spindle 81 of the spindle assembly 80 of each of the wheel clamp assemblies 70, by projecting a tubular spindle 81 of a spindle assembly 80 through a tubular segment 14 of each of the wheel unit sensor assemblies 10, and then tightening down the turnscrew $14_1$ when the levelling vial 15 shows that the arm 12 of the wheel unit sensor assembly is in horizontal position. The tubular spindle 81 of the spindle assembly 80 of each wheel clamp assembly 70 however can be adjusted via manipulation of the knob 92 of the vertical compensating screw 86 or knob 102 of the horizontal compensating screw 96, or both respectively, to align the tubular spindles 81 of the spindle assembies 80 in true horizontal and vertical orientation. No further adjustment of the vertical and horizontal compensating screws 86, 96 need be made. With a wheel unit sensor assembly 10 positioned upon each of the two front wheels, measurements of set back, caster, camber and included angle can be made. Similar measurements can be made on the rear wheels by mounting the wheel unit sensor assemblys 10, via the wheel clamp assemblys 70, upon the rear wheels of the vehicle.

Set back: To measure front wheel set back, reference being made to FIG. 7, the tape 55 is pulled outwardly from the tape reel 51 of each wheel unit sensor housing 40, respectively, of the wheel unit sensor assemblies 10, the ends thereof joined, or locked together via lock members 54 at the center, and the center of the tapes 55 at the point where they are connected pulled outwardly to correspond precisely with the datum body reference point "A" located by the manufacturer of the car at the center line of the vehicle, shown in phantom in the figure. After positioning of the tapes 55 as shown inputs of the measurement are made to the computer. If the two wheels are parallel one with the other, the measurements shown on the computer readout will read the same. If one wheel is set back from the other, the computer readings of set back will differ. Thus, when a tape 55 is pulled forwardly to "A" the pivotally movable yoke-like frame 48 of the wheel unit sensor housing 40 is moved forwardly, and its movement is tracked by the movement of the apertured shield 50. The amount of light from light emitting diode 46 thus falls proportionally greater amount upon cell $47_1$ (and proportionally less on cell $47_2$) this providing accurate readings of the angular differences, or forward distance between the two front wheels. These measurements can be input to the computer, readout and graphically displayed on the C.R.T., or screen, and printed.

Toe: Before toe has been properly set, the steering wheel, S/W, is turned to its mid point, based on the total number of turns between the extremes of maximum left front wheel turn and maximum right wheel turn. The steering wheel is set in place by symmetrically setting the steering wheel brace, or spoke, in place relative to the driver. If the spoke is not in this position mechanical correction is required.

Figure 7:
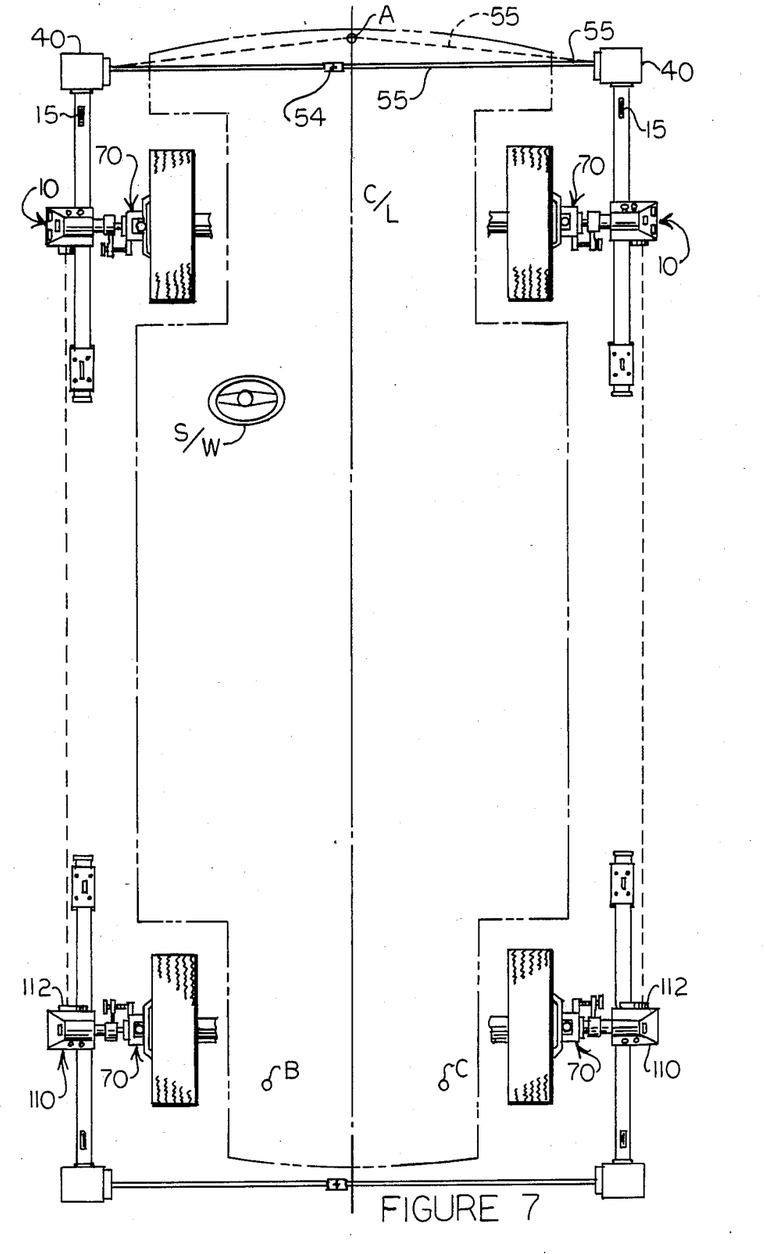
FIG. 7 depicts in plan a view of an automotive vehicle upon each of the front wheels and rear wheels of which are mounted a wheel unit sensor assembly, and upon each of the wheel unit sensor assemblies on the rear wheels is mounted mirrors for measuring steering wheel position as referenced from the thrust or track of the rear wheels.

The toe of the front wheels is measured by joining the two tapes 55 together, and extending them straight across from one wheel unit sensor housing 40 to the other as shown in FIG. 7. The toe of each wheel is measured based on the amount of shift, from a normal or zero position, of the pivotally mounted yoke-like frame 48 of a wheel unit sensor housing 40 which carries the apertured shield 50. A null position occurs when light from the light emitting diode 46, after passage through the aperture $50_1$ of shield 50, falls evenly upon the inside adjacent corners of the sensors $47_1$, $47_2$ of the light detector 47, this indicating zero toe for the wheel upon which the wheel unit sensor assembly 10 is mounted. On the other hand, when the wheel on which the respective wheel unit sensor assembly 10 is toed in more light will fall upon one sensor than upon the other; i.e. more light will fall upon sensor $47_1$ than upon sensor $47_2$, or if there is toe out of the wheel then less light will fall upon sensor $47_1$ then upon $47_2$. Moreover, the intensity of the light falling upon one cell vis-a-vis the other is directly related to the degree of toe in or toe out of the respective wheel. The signals from the wheel unit sensor assemblies 10 mounted on the two wheels can be input to the computer, the output displayed on a C.R.T. or video screen in terms of digital numbers representative of the degrees of toe in or toe out of each respective wheel. These numbers can be simultaneously contrasted with the amount of toe in or toe out recommended by the manufacturer, which can also be digitally displayed on the screen. Simultaneously, the toe of each wheel can be graphically or visually represented on the screen via a display of a pair of wheels, as they would appear in the abstract observed from above, the front portions of which are pointed inwardly or outwardly in some amount in inches, millimeters or degrees. Print outs of this information can also be made.

The toe condition of the rear wheels is determined in similar manner by transferring, or placing a wheel clamp adjustment assembly 70, and wheel unit sensor assembly 10 on each of the rear wheels and attaching together the tapes of the tape reel 51. The toe condition of each rear wheel can be read out from the screen, and graphically displayed.

Rear wheel orientation, or track: The rear wheel orientation, or track condition can be determined by transferring, or placing a wheel clamp adjustment assembly 70 and wheel unit sensor assembly 10 on each of the rear wheels and attaching the end of each tape of a tape reel 51 to frame datum reference points "B" and "C" located on the vehicle body by the vehicle manufacturer. The reading should show that each of the rear wheels, respectively, is equidistant from reference points "B" and "C", respectively; and, if not, the difference is measured in terms of a proportional electrical output from the cell 47, input to the microprocessor and displayed on the video screen of the console. Since rear wheels are coupled via a common axle one to the other these wheels are generally parallel to the frame. If they are not, there is possibly a shifted frame or suspension parts.

Track, or rear wheel orientation, can also be measured after the steering wheel has been positioned by mounting, on each reare wheel, after the front wheels have been adjusted to the specifications recommended by the vehicle manufacturer, a rear wheel unit sensor assembly 110, inclusive of a mirror 112. A rear wheel track assembly 110, like a wheel unit sensor assembly 10, can be mounted upon a wheel clamp assembly 70, which in turn is clamped upon a wheel rim. Track measurements are thus made with a wheel unit sensor assembly 10 mounted in place upon each of the front wheels, each via attachment to a wheel clamp assembly 70 mounted on the rim of a front wheel, and a rear wheel unit sensor assembly 110 mounted in place upon each of the rear wheels, each via attachment to a wheel clamp assembly 70 mounted on the rim of a rear wheel, as shown by reference to FIG. 7. A rear wheel unit sensor assembly 110 is of identical construction to a front wheel unit sensor assembly 10 except that it is provided with mirror 112. A mirror is provided as a target upon the forwardly faced side thereof such that a beam of infrared light received from a forward wheel unit sensor assembly 10 can be reflected back to a detector 9 mounted thereon, and the measurement of this signal input to the computer and read upon the C.R.T., or television screen. The camber and toe of the back wheels can thus be measured via the use of these wheel unit sensor assemblies 110, and the track of the rear wheels by the combined use of the wheel unit sensor assemblies 10 mounted on the front wheels, the mirrors mounted on the rear wheel unit sensor assemblies 110, and detection device 9 located on the first wheel unit sensor assemblies 10.

In measuring track, the front wheels are first adjusted to the specifications recommended by the manufacturer. The target lamp switch 34 of each wheel unit sensor assembly 10, mounted on the front wheels, is then turned on and a dual beam of light is then projected from the lens 32 of the central sensor housing 11 to fall upon the mirror 112 of a rear wheel track assembly 110, one each of which is moounted on a rear wheel. If the front and rear wheels are parallel to the frame, the infrared light beam projected onto the mirror 112 will be reflected back to the window 8 of a respective forward central sensor housing 11 and picked up by the infrared sensitive photoresistive cells 9, this indicating zero deviaion. To the extent that there is deviation the infrared light beams will be projected away from registry with the infrared sensitive photoresistive cells 9, which will indicate that the rear wheels are out of track. These readings can be input to the computer, displayed on a screen and contrasted with the manufacturer's specification also usually displayed.

Caster: Positive caster aids directional stability. A positive caster angle, when viewed from the driver's seat, is the backward tilt of the steering axis, or line through the center of the ball joints, from vertical; or the angle from vertical wherein the center line of the ball joints passes through the road surface ahead of the vertical center line of the wheel. Positive caster also aids steering wheel returnability, or tendency of the steering wheel to return to its center position after making a turn. The caster angle for the wheels of each vehicle is determined and set according to the specifications of the manufacturer.

The caster for each front wheel is determined by mounting a wheel clamp assembly 70 and wheel unit sensor assembly 10 on each wheel, and then adjusting the latter to provide proper horizontal and vertical orientation of the tubular spindle 81. In such measurement, depending upon the amount of tilt away from vertical, the level of liquid 22 within a vial 21 of a caster and camber sensor 20 located within a central sensor housing 11 due to gravity rises in the direction of tilt, and is lowered in the opposite direction. The change in liquid level 22 changes the cell resistance in direct proportion to the degree of tilt, positively when the tilt is toward the center line of the steering axis of the wheel, and negatively when the tilt is in the opposite direction. This signal is output via electrical leads to the computer and is displayed on the screen as a digital number, for comparison with a digital number corresponding to the manufacturer's requirements. Each wheel can also be graphically displayed and its caster compared with a corresponding wheel the caster of which is graphically displayed and set according to the manufacturer's specification. A complete print out, as desired, may also be made of these data.

Camber: The camber angle is positive when the top of a wheel, when viewed from the front, leans outwardly from vertical, and negative when the top of the wheel leans inwardly from vertical. On some vehicles, the manufacturer's specifications require that the top of a wheel be given a slight outward tilt from vertical since, when the vehcile is loaded and travelling along a road, the wheels when viewed from the front will be oriented in a straight up and down or true vertical position. The true vertical or zero camber position, when the vehicle is loaded and running, will thus put the full width of the tire tread on the road surface, and thereby distribute load and wear evenly across the tire tread. Other factors, however, enter into consideration. Most roads are crowned, slightly higher in the center than on the two sides. Hence, when a vehicle moves along one side of a crowned road, the vehicle tends to lean slightly outward and drifts to the right, and hence the outside edge of the tread on the right front tire may tend to wear excessively because it carries more than its share of the weight. To overcome this effect, some vehicles have, e.g., camber settings that give the left front wheel 0.25° more positive camber than the right. Since the vehicle tends to pull toward the wheel with the more positive camber, the effect of the average crowned road is overcome. Another reason for increased positive camber on the left front wheel is that many vehicles are operated with only one driver in them. The driver's weight tends to lower the left side of the vehicle which in turn reduces the positive camber on the left front wheel. Further, the camber of a front wheel becomes slightly negative when the wheel hits a bump; or slightly positive when the wheel drops into a pothole. The wheels, in any regard, are set to the manufacturer's specifications.

The camber of a wheel, front or rear, is determined by mounting a wheel clamp assembly 70 and wheel unit sensor assembly 10 thereupon, with horizontal and vertical adjustment of the latter upon the former prior to making the determinations. The switch 28 of the center sensor housing 11 is punched to cut off the caster and camber sensor 16. Camber is measured by the caster and camber sensor 16 in direct relation to the shift from horizontal of the liquid level 18, the liquid level rising in one end of the tube 17 and falling in the other depending on the amount of tilt of a wheel away from vertical. Positive camber is thus manifested in the left front wheel when the liquid level 18 rises in the end of the vial 17 in the direction of outward tilt and falls in the opposite end of the vial 17. Conversely, negative camber is manifested in the left front wheel when the liquid level 18 rises in the end of the vial 17 in the direction of inward tilt of the wheel, and falls in the opposite end of the vial 17. The differential change in the liquid level 18 on tilting proportionally changes the resistance of the cell as both positive and negative occur, and distinguishes between positive and negative changes. These inputs to the computer are displayed on the C.R.T. or video screen as digital numbers, suitable for comparison with digital numbers corresponding to the manufacturer's camber specification. The camber of each wheel on which a measurement is made can also be graphically displayed and its camber compared with a corresponding graphically displayed wheel the camber of which is set according to the manufacturer's specification.

The included angle: The included angle and KPI are measured by the same sensor, i.e. the KPI and included angle sensor 20 located within the bottom of the central housing unit 30 of the wheel unit sensor assembly 10. The included angle is the sum of the camber and KPI, or steering axis inclination.

It is apparent that various modifications and changes, such as in the absolute and relative dimensions or locations of the component parts, and in the materials of construction without departing the spirit and scope of the invention as will be apparent to those skilled in this art.

A preferred wheel alignment system will include left and right front wheel sensor assembly units 10, as described, and left and right rear wheel sensor assembly units 110, which includes mirrors 112 mounted and forwardly faced upon the central housings of said assembly units for use in the measurement of track. Since however the left and right rear wheel sensor assembly units 110 are not normally used to make all of the measurements required of the left and right front wheel sensor assembly units 10, certain components and sub-assemblys may be omitted from the left and right rear wheel sensor assembly units 110, viz. the Xenon tube 30 and infrared L.E.D. $29_A$, lens and lens holder, the strobe and photo cell circuit board, photosensitive resistance cells and light filters, sensor 20 and switches associated therewith. The central housing assembly of a left and right rear wheel sensor assembly unit 110 thus each includes a mirror 112, run out switch 36 and sensor 16. Unlike the central housing assemlby of a left and right front wheel sensor assembly unit 10, it does not include an included angle switch 28, a caster zero switch 34, limp switch 35, or any type of light emission devices (other than a mirror), or light detector devices; since this would be superfluous.

Having described the invention what is claimed is:

1. In a wheel unit sensor assembly, each of a pair of which can be mounted via a wheel clamp assembly upon parallelly disposed wheels of a motor vehicle for the alignment and balance of said wheels of the vehicle, a sensing unit for measuring front wheel set back and toe which comprises
    a housing formed by enclosing walls,
    a first frame rigidly mounted upon a wall of said housing,
    a light emitting diode mounted on said first frame,
    a light detector mounted opposite said light emitting diode, in-line therewith, and upon which light from the light emitting diode is directed,
    a second frame pivotally mounted upon said first frame,
    an apertured shield mounted upon an arm of said second frame and pivotable therewith, the apertured portion of the apertured shield extending between said light emitting diode and said light detector, through which aperture light can be transmitted from the light emitting diode to the detector,
    a tape reel affixed to said second frame,
    a slot located within a wall of said housing through which the tape from said reel can be extended and joined to an end of tape from the reel of a corresponding wheel unit sensor assembly mounted on the alternately disposed wheel,
    whereby front wheel set back, and toe can be detected and measured via differences in the intensity of light transmitted through the aperture of said apertured shield, and picked up by the light detector.

2. The apparatus of claim 1 wherein the light detector is provided with a pair of cells, spaced apart one from the other, and the apertured shield is provided with a single opening through which light emitted from the light emitting diode is proportioned between the two cells dependent upon wheel positioning, or the angularity of the wheels to measure wheel set back and toe.

3. The apparatus of claim 1 wherein the walls of the housing completely enclose the light emitting diode and light detector so that background light is completely eliminated from the housing.

4. The apparatus of claim 1 wherein the wheel unit sensor assembly includes a second unit for sensing the KPI and included angle of a wheel, and the caster and camber of a wheel respectively, said second unit being contained within a second housing, the second housing containing a pair of vials horizontally mounted at 90° angles one with respect to the other, one vial being parallel to the plane of a wheel and the other perpendicular to the plane of a wheel when the wheel unit sensor assembly is in place upon a wheel, each vial being filled with a low conductivity fluid, a plurality of spaced apart conductive probes mounted within the bottom of a vial, vertically disposed and extended upwardly through the liquid, constituting the variable resistance of a bridge circuit which provides output signals indicative of the angle of inclination of the vials from horizontal whereby the vial mounted parallel to the wheel senses the KPI and included angle of a wheel, and the other the caster and camber of a wheel.

5. The apparatus of claim 4 wherein the second housing additionally contains an elongated bar projected therethrough, said second housing is substantially centrally mounted upon said bar, and said first housing is mounted on a terminal end of said bar.

6. The apparatus of claim 5 wherein the terminal end of the bar opposite said first housing is provided with counterpoise slidably mounted thereon to facilitate mounting, and adjustment of a wheel unit sensor assembly upon a wheel.

7. The apparatus of claim 4 wherein vials are provided with means for producing electrical signals, and the electrical signals from the vials of a wheel unit sensor assembly are electronically input to a microprocessor indicative of the KPI, included angle, caster and camber of a wheel, input is continuously compared with the vehicle manufacturer's recommended specifications as the alignment and balance of the wheels are changed to correspond with the manufacturer's specifications, and both the input from the wheel unit sensor assembly and input of the vehicle manufacturer's specifications are output, for contrast and comparison on a video screen.

8. The apparatus of claim 1 wherein light transmitted from the light detector of a wheel unit sensor assembly is converted via photoelectric means into an electrical signal indicative of the front wheel set back, and toe of the wheels being aligned and balanced, the electrical signal is input to a microprocessor and this input is continuously compared with the vehicle manufacturer's recommended specifications as the alignment and balance of the wheels are changed to correspond with the manufacturer's recommended specifications, and both the input from the wheel unit sensor assembly and input of the vehicle manufacturer's specifications are output, for contrast and comparison on a video screen.

9. The apparatus of claim 4 wherein the second housing of the wheel unit sensor assembly includes light transmitting means, and light detector means for the pick-up of reflected light from said light transmitting means.

10. The apparatus of claim 9 wherein the light transmitting means transmits both visible and infrared light, and strobe circuit associated with said light transmitting means.

11. A wheel unit sensor assembly, each of a pair of which can be mounted via a wheel clamp assembly upon parallelly disposed wheels of a motor vehicle for the alignment and balance of said wheels of the vehicle, which in combination comprises a first complementary unit for measuring front wheel set back and toe, and a second complementary unit for measuring the KPI, included angle, caster, and camber of a wheel, each affixed upon a bar and provided with means for mounting said wheel unit sensor assembly upon a wheel via attachment to said wheel clamp assembly, said first complementary unit including a light emitting diode mounted upon a wall and within the enclosing walls of a first housing, a light detector mounted opposite and in-line with said light emitting diode toward which light from the light emitting diode is directed, a frame pivotally attached to said wall, an apertured shield mounted upon an arm of said frame and pivotable therewith, the apertured shield extending between said light emitting diode and said light detector such that light from the diode can be transmitted through the aperture of the shield to the detector, or interrupted and reduced by the nonaperture portion of the shield, a tape reel affixed to said frame, a slot located within a wall of said first housing through which the tape from said reel can be extended and joined to an end of tape from the reel of a corresponding wheel unit sensor assembly mounted on the alternately disposed wheel, such that different wheel portions and angles will produce different angular settings between the apertured shield and alter the intensity of the light transmitted through the aperture to the detector which differences can be measured and translated into front wheel set back and toe, said second complementary unit including a pair of vials horizontally mounted at 90° angles one with respect to the other within a second housing, one vial being parallel to the plane of a wheel and the other perpendicular to the plane of a wheel when the wheel unit sensor assembly is in place upon a wheel, each vial being filled with a low conductivity fluid, a plurality of spaced apart conductive probes mounted within the bottom of a vial, vertically disposed and extended upwardly through the liquid, constituting the variable resistance of a bridge circuit which provides output signals indicative of the angle of inclination of the vials from horizontal, the vial mounted parallel to the wheel sensing the KPI and included angle of a wheel, and the vial mounted perpendicular to the plane of the wheel sensing the caster and camber of a wheel.

12. The apparatus of claim 11 wherein the first complementary unit is mounted on a terminal end of said bar, and said second complementary unit is substantially centrally mounted upon said bar.

13. The apparatus of claim 12 wherein the terminal end of the bar opposite said first complementary unit of the apparatus combination is provided with a counterpoise slidably mounted thereon to facilitate mounting, and adjustment of a wheel unit sensor assembly upon a wheel.

14. The apparatus of claim 11 wherein light transmitted from the light detector of the first complementary unit of a wheel unit sensor assembly is converted via photoelectric means into an electrical signal indicative of the front wheel set back, and toe of the wheels being aligned and balanced, the electrical signal is input to a microprocessor and this input continuously compared with the vehicle manufacturer's recommended specifications as the alignment and balance of the wheels are changed to correspond with the manufacturer's recommended specifications, and both the input from the wheel unit sensor assembly and input of the vehicle manufacturer's specifications are output, for contrast and comparison on a video screen, and the vials of the second complementary unit of of the wheel unit sensor assembly are provided with means for producing electric signals, and the electrical signals from the vials of a wheel unit sensor assembly are electronically input to a microprocessor indicative of the KPI, included angle, caster and camber of a wheel, input is continuously compared with the vehicle manufacturer's recommended specifications as the alignment and balance of the wheels are changed to correspond with the manufacturer's specifications, and both the input from the wheel unit sensor assembly and input of the vehicle manufacturer's specifications are output, for contrast and comparison on said video screen.

* * * * *